United States Patent [19]

Pampouchidis et al.

[11] Patent Number: 4,590,009
[45] Date of Patent: May 20, 1986

[54] STABILIZED POLYISOCYANATES PARTIALLY BLOCKED WITH HYDROXY AMINES

[75] Inventors: Georg Pampouchidis, Graz; Herbert Deu, Kalsdorf, both of Austria

[73] Assignee: Vianova Kunstharz, A.G., Werndorf, Austria

[21] Appl. No.: 728,699

[22] Filed: Apr. 29, 1985

Related U.S. Application Data

[63] Continuation of Ser. No. 161,499, Jun. 20, 1980, abandoned.

[30] Foreign Application Priority Data

Jun. 22, 1979 [AT] Austria .................................. 4394/79

[51] Int. Cl.$^4$ .................... C07C 118/00; C07C 67/62; C07C 69/00
[52] U.S. Cl. ........................................ 560/332; 560/2; 560/3; 560/4
[58] Field of Search ................. 260/453 SP; 560/2, 3, 560/4, DIG. 55

[56] References Cited

U.S. PATENT DOCUMENTS

| | | | |
|---|---|---|---|
| 3,226,413 | 12/1965 | Smith | 260/453 SP |
| 4,089,835 | 5/1978 | Konig et al. | 260/33.2 R X |
| 4,238,594 | 12/1980 | Pampouchidis | 528/69 |

FOREIGN PATENT DOCUMENTS

| | | | |
|---|---|---|---|
| 130577 | 4/1978 | German Democratic Rep. | 560/4 |
| 39-20840 | 9/1964 | Japan | 560/4 |

*Primary Examiner*—Joseph Paul Brust
*Attorney, Agent, or Firm*—A. W. Breiner

[57] ABSTRACT

Hydrazine is utilized for preventing side reactions during the preparation and storage of polyisocyanates partially blocked with hydroxy amines which are utilized for the introduction of basic functional groups into organic coating compositions which are deposited cathodically in an electrodeposition process. The inhibiting compound is used in the form of hydrazine hydrate at a level of from about 50 to 5000 ppm calculated on the amine used in the reaction.

6 Claims, No Drawings

STABILIZED POLYISOCYANATES PARTIALLY BLOCKED WITH HYDROXY AMINES

This is a continuation of application Ser. No. 06/161,499 filed June 20, 1980, now abandoned.

The present invention is concerned with the use of hydrazine, in the form of hydrazine hydrate, as an additive to enhance the stability during preparation and storage of polyisocyanates partially blocked with hydroxy amines.

United States patent application Ser. No. 816,936 filed July 19, 1977, now U.S. Pat. No. 4,238,594, describes coating compositions for cathodically depositable electrodeposition paints which comprise the reaction product of (A) an unsaturated copolymer and/or polycondensation product and/or polyaddition product, containing for each 1000 molecular weight units at least 0.5, and preferably 0.8 to 3.0, side chain or chain ending double bonds; and (B) a reaction product having one free isocyanate group obtained by reacting an aromatic and/or aliphatic and/or cycloaliphatic di- or polyisocyanate and an amine of the general formula.

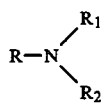

wherein R is an alkanol or hydroxyphenyl radical and $R_1$ and $R_2$ are alkyl, aryl or cycloalkyl radicals. The reaction product of (A) and (B) is rendered water soluble through partial or total neutralization thereof with inorganic and/or organic acids. Depending on the final use, base resins with a higher or lower number of double bonds, i.e., the number of double bonds in 1000 molecular weight units, can be chosen to obtain various polymerization capacities, it only being essential that there is at least 0.5 double bonds for each 1000 molecular weight units. The coating compositions as above described are highly satisfactory in that being thermosetting they do not require crosslinking agents for curing.

It has been found, however, that the isocyanate compounds utilized in the preparation of the aforesaid coating compositions have a relative instability, since owing to their basic character the reactivity of the free isocyanate groups is strongly catalyzed which in turn leads to addition reactions believed to be according to the equation:

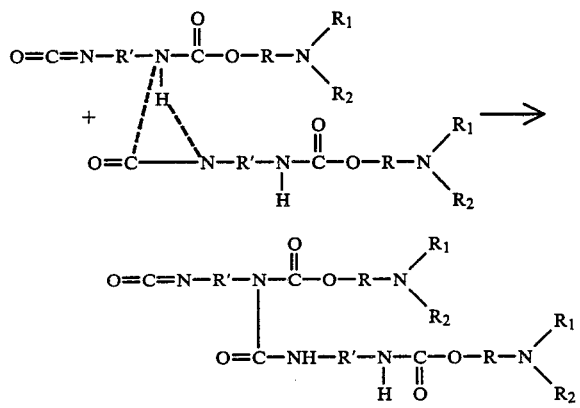

This undesired side reaction, within a short time, leads to a decline in the isocyanate value and to a rise in viscosity of the isocyanate compound. It has been found that the isocyanate intermediates, the isocyanate value of which has fallen to about 55-60% of the original value, cannot be used for the preparation of cathodically depositable binders since the binders produced therefrom exhibit poor dilutability and exhibit changes in their deposition behavior. This, in turn, leads to non-uniform films. Accordingly, it is necessary to carry out the preparation of the intermediate at the lowest possible temperature. However, this leads to high cooling costs and, furthermore, the intermediate has to be processed immediately after production. Since, however, in large scale production there always is the danger of delays or interruptions (e.g., by power failure, cooling water failure, etc., or other technical shortcomings), the hazards of material and time losses or of quality fluctuations are very heavy.

It has now been found that it is possible to inhibit the above-mentioned side reaction and, thus, to safeguard production and to ensure storage stability of the basic isocyanate intermediate to such a substantial extent as to guarantee uniform and safe production of the final products. This invention is concerned, therefore, with the use of hydrazine (hydrate) as an additive to inhibit side reactions during production and storage of polyisocyanates partially blocked with hydroxy amines, at a level of from 50 to 5000 ppm, preferably from 100 to 2000 ppm of hydrazine hydrate, calculated as 100% hydrazine hydrate, in relation to or based on the reacting amine.

The essential advantages of the addition of hydrazine hydrate during the production of the reaction product according to the present invention are the following:

1. Greater safety in the production of the basic isocyanate intermediate and a relatively stable isocyanate value;
2. Easy control of the heat resulting from the exothermic reaction during reaction of the amine with the polyisocyanate; for, if necessary, addition time may be prolonged or the reaction temperature maximum may be raised to 40° C.; and
3. Good reproducibility of the properties of the final product (viscosity, solubility, electrochemical performance) which essentially are governed by the quality of the basic isocyanate intermediate.

The hydrazine hydrate can be employed in any form available on the market, preferably, however, as 100% hydrazine hydrate. In this form the active hydrazine content is 64%.

The preparation of the basic isocyanate intermediate is carried out in order that the polyisocyanate diluted with an isocyanate inert solvent is charged and, while cooling and stirring, the hydroxy amine containing the hydrazine hydrate is added at 10° to 40° C., preferably at 15° to 30° C., over a period of 30 to 120 minutes, preferably 60 to 75 minutes. The isocyanate intermediate can be further processed immediately after the addition of the amine, e.g., as described in the above-mentioned patent application U.S. Ser. No. 816,936. No influence could be found of the hydrazine either on further processing or in the final product.

Starting materials for the preparation of the basic isocyanate product are aromatic, cycloaliphatic or aliphatic polyisocyanates, which includes the diisocyanates. Suitable amine components are alkanol amines, such as dimethylethanol amine or higher homologues or isomers thereof. For a more complete list of starting materials, reference is made to the disclosure of application Ser. No. 816,936, the disclosure thereof being incorporated herein by reference.

The following examples illustrate the invention without limiting its scope. All quantities are by weight and percentages are percentages by weight.

EXAMPLES 1-6 OF INVENTION, AND COMPARISON EXAMPLES 7-9

The diisocyanate diluted with ethylene glycol monoethyl ether acetate is cooled to below 20° C., and, preventing access of moisture, the amine having been thoroughly mixed with 1000 ppm of hydrazine hydrate (100%) is slowly added while stirring and cooling. The quantities of reaction partners and the reaction conditions are listed in Table 1. The level of solvents is chosen in order that the finished intermediate has a solids content of 60%. With the listed examples, the limit of usefulness for further processing according to U.S. patent application Ser. No. 816,936 is attained at an NCO-value of about 9 to 10%.

The table lists the reduction in NCO-value in dependence from the time and reaction temperature. As can be seen from the comparison examples, the intermediates not containing hydrazine hydrate have to be processed further immediately, while those containing the inhibitor tolerate much longer delays. Further processing is carried out as disclosed by the above-mentioned patent application.

was no suggestion known to applicants of using hydrazine hydrate as a stabilizer for partially blocked polyisocyanates leading to the surprising results presently discovered.

In the above illustrative examples, various modifications can be made falling within the scope of the claimed invention. Such modifications being within the ability of one skilled in the art are within the scope of the present invention.

It is claimed:

1. The method of reducing side reactions during the preparation and during storage of a compound having one free isocyanate group and obtained by reacting a member of the group consisting of aromatic, aliphatic, and cycloaliphatic polyisocyanates and mixtures thereof, and an amine of the general formula

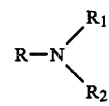

wherein R is an alkanol or hydroxyphenyl radical, and $R_1$ and $R_2$ are alkyl, aryl or cycloalkyl radicals by the addition of from about 50 to 5000 ppm of hydrazine hydrate based on the said reacting amine.

2. The method of claim 1 wherein said hydrazine hydrate is present in an amount of from 100 to 2000 ppm based on the reacting amine.

TABLE 1

| Example | Reaction Components Polyisocyanate | Amine | Reaction Conditions Addition Time | Temperature | Isocyanate Value (Calculated On Solids) Theor. | At End Of Addition | +1 Hour | +3 Hours | +5 Hours |
|---|---|---|---|---|---|---|---|---|---|
| 1 | 174 TDI | 89 DMEA | 60 min. | 15–25° C. | 15.9% | 14.8% | 14.5% | 13.9% | 12.5% |
| 2 | 174 TDI | 89 DMEA | 60 min. | 25–35° C. | 15.9% | 14.2% | 13.8% | 13.0% | 12.0% |
| 3 | 174 TDI | 117 DEEA | 60 min. | 20–30° C. | 14.4% | 13.5% | 13.0% | 12.4% | 12.1% |
| 4 | 174 TDI | 117 DEEA | 90 min. | 20–30° C. | 14.4% | 13.0% | 12.6% | 11.8% | 11.2% |
| 5 | 174 TDI | 103 DMPA | 60 min. | 20–30° C. | 15.1% | 14.1% | 13.4% | 12.8% | 12.2% |
| 6 | 222 IPDI | 89 DMEA | 60 min. | 25–40° C. | 13.5% | 13.2% | 12.9% | 12.5% | 12.3% |
| 7 | As in Example 2 Without Hydrazine Hydrate | | | | 15.9% | 12.0% | 9.2% | not usable | |
| 8 | As in Example 3 Without Hydrazine Hydrate | | | | 14.4% | 12.5% | 10.4% | not usable | |
| 9 | As in Example 4 Without Hydrazine Hydrate | | | | 14.4% | 10.7% | 9.0% | not usable | |

Key to Abbreviations In Table 1:
TDI Toluene diisocyanate (available isomer blend)
IPDI Isophorone diisocyanate
DMEA Dimethylethanol amine
DEEA Diethylethanol amine
DMPA Dimethylpropanol amine Although hydrazine and hydrazine hydrate are well known in the art as, for example, according to Ullmann, "Enzyklopädie der technischen Chemie," 4th edition (1977), Vol. 13, pages 13 ff., where hydrazine hydrate is used as an intermediate for pesticides, as a blowing agent for plastics, or as a corrosion protection agent in kettle waters; with other known uses being for catalytic hydration and autophoretic deposition, heretofore there 3. The method of claim 1 wherein said hydrazine hydrate is mixed with said amine prior to the reaction with said polyisocyanate.

4. The reaction product according to claim 1.
5. The reaction product according to claim 2.
6. The reaction product according to claim 3.

* * * * *